United States Patent [19]
Brady, Jr. et al.

[11] Patent Number: 6,096,430
[45] Date of Patent: Aug. 1, 2000

[54] ROBUST, NONTOXIC, ANTIFOULING POLYMER

[75] Inventors: Robert F. Brady, Jr., Gaithersburg, Md.; Gregory T. Pawlikowski, Stewartstown, Pa.

[73] Assignee: The United States of America as represented by the Secretary of the Navy, Washington, D.C.

[21] Appl. No.: 08/872,321

[22] Filed: Jun. 10, 1997

Related U.S. Application Data

[62] Division of application No. 08/606,107, Feb. 23, 1996, Pat. No. 5,652,027.

[51] Int. Cl.[7] .................................................. B32B 27/40

[52] U.S. Cl. ................ 428/423.1; 114/67 R; 428/424.2; 428/424.8; 428/425.1; 428/425.5; 428/425.6; 428/425.8

[58] Field of Search .............................. 428/423.1, 424.2, 428/424.8, 425.1, 425.5, 425.6, 425.8; 114/67 R

[56] References Cited

U.S. PATENT DOCUMENTS

| | | | |
|---|---|---|---|
| 3,890,265 | 6/1975 | Corrigan | 524/417 |
| 3,896,753 | 7/1975 | Shephard et al. | 114/67 R |
| 4,329,277 | 5/1982 | Murphy | 523/122 |
| 4,437,892 | 3/1984 | Kelsey | 106/15.05 |
| 4,839,456 | 6/1989 | Kent | 528/33 |
| 5,017,322 | 5/1991 | Brooks | 264/255 |
| 5,028,453 | 7/1991 | Jeffrey et al. | 427/575 |
| 5,037,677 | 8/1991 | Halpern et al. | 427/338 |
| 5,064,928 | 11/1991 | Kase et al. | 528/85 |
| 5,120,816 | 6/1992 | Gould et al. | 528/76 |
| 5,192,603 | 3/1993 | Slater et al. | 428/217 |
| 5,194,504 | 3/1993 | Lebovits et al. | 525/131 |

*Primary Examiner*—D. S. Nakarani
*Attorney, Agent, or Firm*—Amy Loch Ressing; Barry A. Edelberg

[57] ABSTRACT

A robust, nontoxic, antifouling coating and bulk material and process for making the same are disclosed. The antifouling coating comprises a basecoat formed typically from a polyol and a poiyiisocyanate wherein a molar excess of poiyiisocyanate is typically used. A topcoat is formed on the basecoat by reacting the basecoat with aliphatic branched or unbranched mono-alcohol or polyol.

10 Claims, 5 Drawing Sheets

ROBUST, NONTOXIC, ANTIFOULING POLYMER

This is a divisional of application Ser. No. 08/606,107, filed on Feb. 23, 1996, now U.S. Pat. No. 5,652,027 to Brady et al., titled ROBUST, NONTOXIC ANTIFOULING POLYMER.

BACKGROUND OF THE INVENTION

1. Field of the Invention

The present invention is directed to a bulk material, a coating and a process for making the same wherein the coating and the bulk material are antifouling (adhesion resistant), nontoxic and robust materials (e.g. chemically, thermally and mechanically suited to prolonged use in sea water). More particularly, the bulk material, the coating and the process of the presently disclosed invention involve the formation of an exterior layer which inhibits and/or decreases the rate of growth and/or attachment of marine organisms and/or marine plant life to the exterior layer when submerged in water (especially for prolonged periods of time). The polymer of the presently disclosed invention (either as a bulk material or as a coating) has a nontoxic surface which is minimally attractive to the settlement of marine organisms and plants.

2. Description of the Related Art

Most surfaces (if not all) immersed in the sea become covered with marine organisms. The diversity of these organisms and the environments in which they live create complex problems which any useful antifouling coating must overcome. The problem is most acute for ships. Fouling organisms (organisms that attach to surfaces such as exterior ship hulls exposed to sea water) add weight, increase hydrodynamic drag, increase fuel consumption, facilitate corrosion of the hull and decrease speed, maneuverability and range.

Toxic coatings containing metals have been the technology of choice to prevent fouling. Although effective on a broad range of fouling organisms, these metals are also toxic to non-target animals and plants. Unintended mortality of fish and shellfish (in particular) is an undesirable toxic characteristic of these antifouling coatings containing metals. Compounds containing arsenic, cadmium, lead and mercury are now proscribed. Presently, tin containing antifouling compounds are still used in restricted circumstances and copper compounds are still used widely. However, environmental authorities around the world have expressed their intent to ban paints containing high levels of copper and tin and move quickly toward the use of nontoxic antifouling compounds as soon as effective substitutes become available.

Organic polymers have been used as binder resins in antifouling coatings. In order to impart the durability needed for prolonged underwater service, these resins possess a high proportion of polar functional groups such as esters (—COOR) and ethers (R—O—R'). These polar functional groups, however, provide a polar surface well suited for bonding to, for example, barnacles, limpets, diatoms, grass and other marine organisms.

Other organic polymers such as polyethylene $\{-(-CH_2CH_2)_m-\}$ or polypropylene $\{-(-CH(CH_3)-CH_2-)_m-\}$ are constructed entirely from nonpolar functional groups wherein m is a positive integer. However, while these materials bond weakly to marine organisms, they also bond weakly to underlying paint layers and also lack the thermal and mechanical stability needed for extended immersion in water. In addition, because these nonpolar functional group organic polymers are not dissolved, softened or even wetted by conventional solvents, it is extremely difficult to lay these polymers down as a smooth, nonporous film. Being porous, these polymers are susceptible to penetration of adhesives from marine organisms wherein a strong physical bond is formed with such an organic polymer even when chemical incompatibility is present.

SUMMARY OF THE INVENTION

It is therefore an object of the present invention to provide a robust (sufficient mechanical, chemical and thermal strength for an antifouling material), nontoxic and antifouling (or essentially antifouling) material (or polymer).

It is therefore another object of the present invention to provide a robust, nontoxic and antifouling (or essentially antifouling) coating (or polymer).

It is therefore yet another object of the present invention to provide a robust, nontoxic and antifouling material wherein the material is relatively nonporous (or essentially nonporous) imparting sufficient antifouling characteristics to the material (or polymer).

It is therefore still another object of the present invention to provide a robust, nontoxic and antifouling material (or polymer) wherein the material (or polymer) readily binds to a surface such as a ship hull while maintaining its robust, nontoxic and antifouling characteristics.

It is therefore yet still another object of the present invention to provide a robust, nontoxic and antifouling coating (or polymer) wherein the coating (or polymer) readily binds to a surface such as a ship hull while maintaining its robust, nontoxic and antifouling characteristics.

It is therefore a further object of the present invention to provide a robust, nontoxic and antifouling material (or polymer) wherein the material (or polymer) readily binds to a surface such as a ship hull while maintaining its robust, nontoxic and antifouling characteristics without the use of toxic metals.

It is therefore an even further object of the present invention to provide a robust, nontoxic and antifouling coating (or polymer) wherein the coating (or polymer) readily binds to a surface such as a ship hull while maintaining its robust, nontoxic and antifouling characteristics without the use of toxic metals.

It is therefore even yet a further object of the present invention to provide a robust, nontoxic and antifouling material (or polymer) wherein the material (or polymer) readily binds to a surface such as a ship hull while maintaining its robust, nontoxic and antifouling characteristics without the use of toxic metals such as arsenic, cadmium, lead, mercury and mixturtes thereof.

It is therefore still a further object of the present invention to provide a robust, nontoxic and antifouling coating (or polymer) wherein the coating (or polymer) readily binds to a surface such as a ship hull while maintaining its robust, nontoxic and antifouling characteristics without the use of toxic metals such as arsenic, cadmium, lead, mercury and mixtures thereof It is therefore still an even further object of the present invention to provide a robust, nontoxic and antifouling bulk material (or polymer) wherein the bulk material (or polymer) readily binds to a surface such as a ship hull while maintainaing its robust, nontoxic and antifouling characteristics without the use of metals such as arsenic, cadmium, lead, mercury, tin, copper and mixtures thereof.

It is therefore an additional object of the present invention to provide a robust, nontoxic and antifouling coating (or polymer) wherein the coating (or polymer) readily binds to a surface such as a ship hull while maintinaing its robust, nontoxic and antifouling characteristics without the use of metals such as arsenic, cadmium, lead, mercury, tin, copper and mixtures thereof.

It is therefore yet an additional object of the present invention to provide a process for making a coating and/or a bulk material that is robust, nontoxic and antifouling wherein the coating and/or bulk material readily binds to a surface such as a ship hull while maintinaing its robust, nontoxic and antifouling characteristics without the use of metals such as arsenic, cadmium, lead, mercury, tin, copper and mixtures thereof.

These and other objects are accomplished by an exemplary process (I) for making an exemplary antifouling coating comprising the steps of:

(1) bonding a basecoat upon a substrate by reacting a diol (A) having the structure:

HO—(CH$_2$)$_n$—OH     (A)

with a diisocyanate (B) having the structure:

OCN—(CH$_2$)$_y$NCO     (B)

wherein moles of said diisocyanate (B) is in a molar excess to moles of said diol (A), wherein each of integers n and y are greater than or equal to six; and (2) forming a topcoat on said basecoat by reacting a diol (C) with said basecoat, said diol (C) being selected from the group consisting of:

HO—(CH$_2$)$_{n'}$—OH     (C1);

branched aliphatic diol having a molecular weight between about 118–10,000 grams (C3); and mixtures thereof;

wherein said n' is an integer greater than or equal to six in an amount sufficient to react with at least 30% of said OCN— groups of said basecoat.

Alternatively, an exemplary antifouling bulk material is made by an exemplary process (II) comprising the steps of:

(1) reacting a diol (A) having the structure:

HO—(CH$_2$)$_n$—OH     (A)

with a diisocyanate (B) having the structure:

OCN—(CH$_2$)$_y$NCO     (B)

wherein moles of said disocyanate (B) is in a molar excess to moles of said diol (A), wherein each of integers n and y are greater than or equal to six; and (2) additionally reacting a diol (C) being selected from the group consisting of:

HO—(CH$_2$)$_{n'}$—OH     (C1);

branched aliphatic diol having a molecular weight between about 118–10,000 grams (C3); and mixtures thereof;

wherein said n' is an integer greater than or equal to six in an amount sufficient to react with at least 30% of said OCN— groups.

Note that while an exemplary diol (A) and an exemplary diol (C) and an exemplary diisocyanate (B) are depicted, various triols and other polyols and various triisocyanates and other polyisocyanates may be used in place of the exemplary diols and exemplary diisocyantes depicted above, respectively.

Typically, to form the basecoat 14 (See FIG. 1, infra), the number of —NCO groups (from the polyisocyanate) must be in excess of the number of —OH groups (from the polyol). Broadly, the products of either of exemplary process (I) or exemplary process (II), noted above, form the exemplary robust, nontoxic and antifouling coating or bulk material of the present invention, respectively.

BRIEF DESCRIPTION OF THE DRAWINGS

None of the Figures listed below are drawn to scale.

Figure 5:
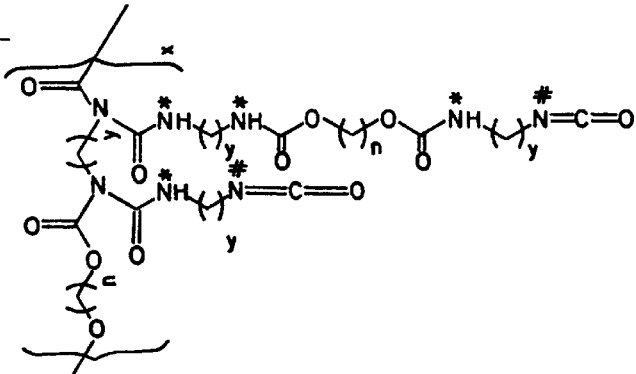
FIG. 5 schematically shows the exemplary orientation of the substrate 10 to the basecoat 14 and topcoat 12 shown in FIG. 4.
Figure 6:
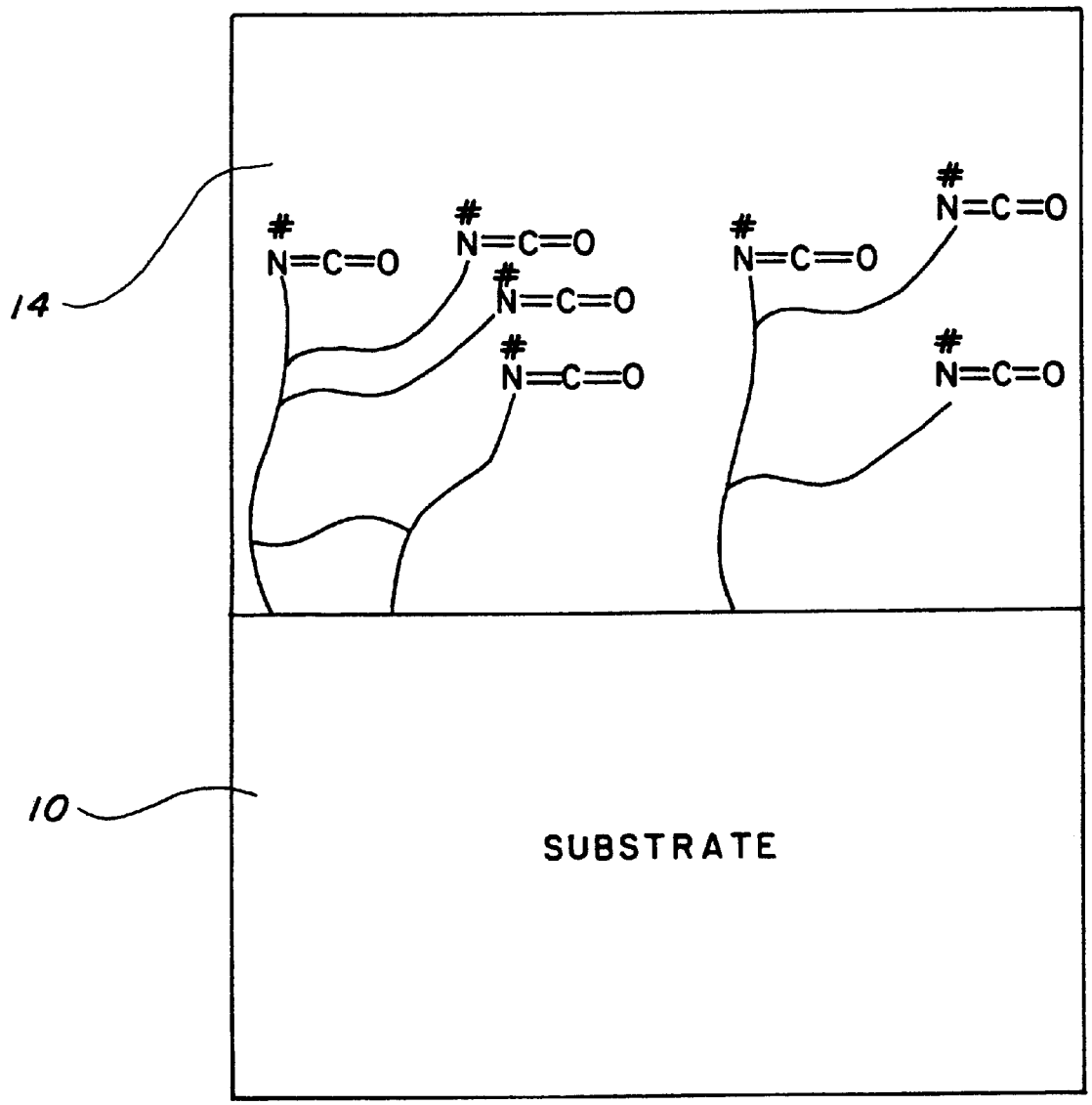
FIG. 6 schematically shows the exemplary terminal unreacted —NCO groups of the basecoat 14, the basecoat 14 being attached to substrate 10.
Figure 7:
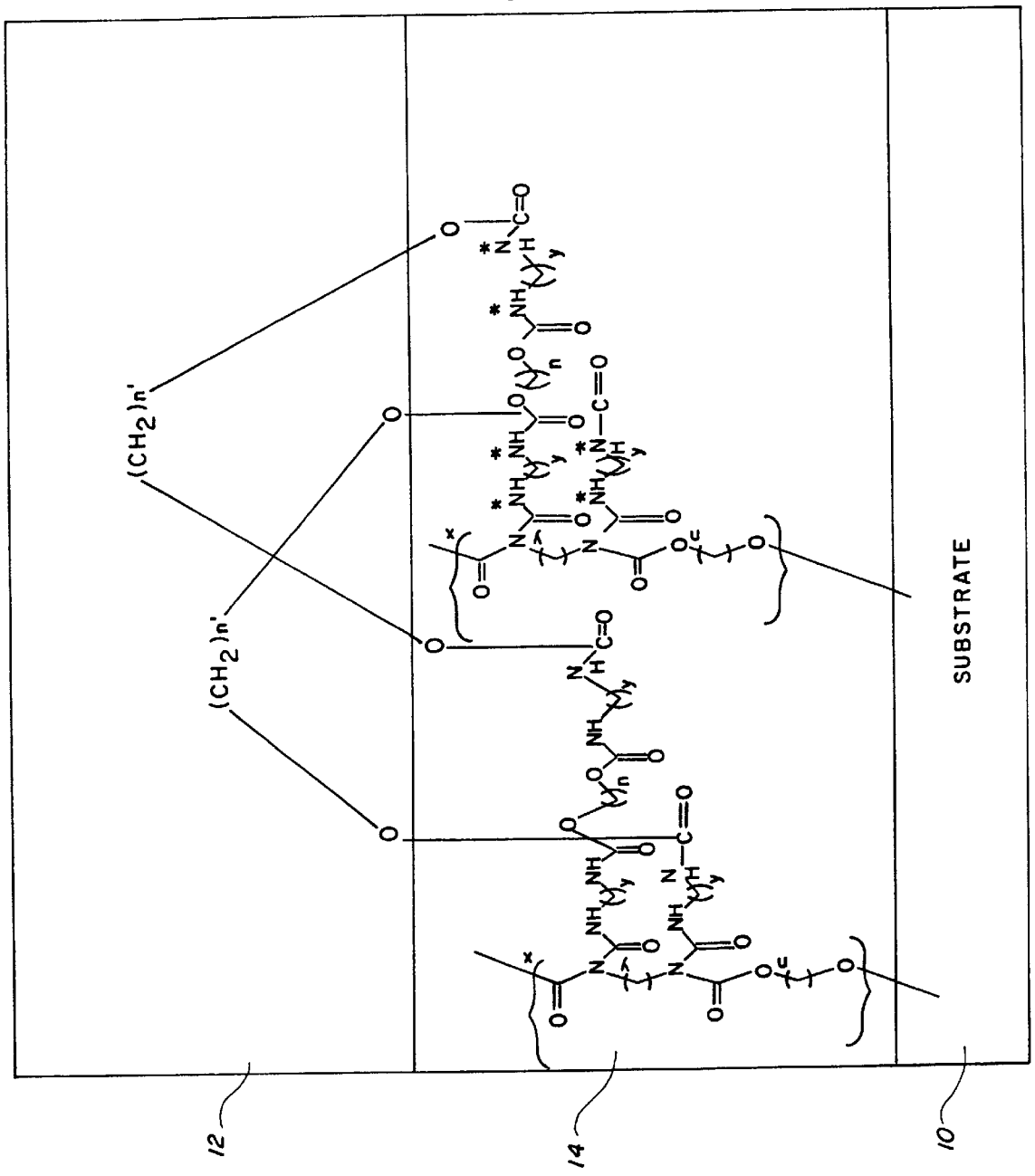
FIG. 7 schematically shows the exemplary topcoat 12 structure as formed on exemplary basecoat 14 structure, the basecoat 14 being attached to substrate 10.

Though not shown in FIGS. 5, 6, or 7, in the case of a substrate having surface hydroxyl groups, the basecoat 14 typically attaches to the substrate 10 via urethane linkages (i.e. —OCONH—).

DETAILED DESCRIPTION OF THE PREFERRED EMBODIMENTS

The following detailed description of the preferred embodiment is provided to aid those skilled in the art in practicing the present invention. However, the following detailed description of the preferred embodiment should not be construed to unduly limit the present invention. Variations and modifications in the embodiments discussed may be made by those skilled in the art without departing from the scope of the present inventive discovery.

The exemplary coating 20 of the presently disclosed invention comprises a two-layer coating system, a basecoat 14 and a topcoat 12. In general, the basecoat 14 is a polyurethane type coating tailored to provide adhesion and/or bonding to the exemplary substrate 10 (e.g. ship hull) and to provide chemical reactivity toward the topcoat 12. Typically, the topcoat 12 is comprised of a material having a chemical nature somewhat similar to polyethylene but possessing reactive groups which form covalent linkages with reactive groups (e.g. —NCO) of the basecoat 14. Typically, the topcoat 12 completely (or nearly completely) covers the basecoat 14. The topcoat 12 bonded to the basecoat 14 obtains thermal and mechanical strength from its bonds to the basecoat 14.

An exemplary polyurethane basecoat 14 can be prepared by the reaction of a polyol with a polyisocyanate. A suitable exemplary polyol (a diol) for forming the basecoat has the formula:

$$HO\text{—}(CH_2)_n\text{—}OH \qquad (A)$$

wherein n is an integer greater than or equal to six Typically, n is an integer 6–1000 (i.e. 6, 7, 8, 9, 10, 11, 12, 13, 14, 15, 16, 17, 18, 19, 20 . . . 1000). More typically, n is an integer 7–500. Most typically, n is an integer 8–300. Preferably, n is an integer 9–100. More preferably, n is an integer 10–20. Most preferably, n is an integer 12, 13, 14, or 15. Though only diol (A) is depicted above, a wide variety of diols, triols, and other polyols may be used in place of diol (A) wherein the —OH groups of the polyol reacts with the isocyanate group of the polyisocyanate.

A suitable exemplary polyisocyanate (a diisocyanate) for forming the basecoat 14 has the formula:

$$OCN\text{—}(CH_2)_y NCO \qquad (B)$$

wherein y is an integer greater than or equal to six. Typically, y is an integer 6–1000 (i.e. 6, 7, 8, 9, 10, 11, 12, 13, 14, 15, 16, 17, 18, 19, 20 . . . 1000). More typically, y is an integer 7–500. Most typically, y is an integer 8–300. Preferably, y is an integer 9–100. More preferably, y is an integer 10–20. Most preferably, y is an integer 12, 13, 14, or 15.

Exemplary suitable substrates 10 include materials that have polar surface chemical groups such as glass, vitreous materials, ceramics, steel, aluminum, wood, paper and some plastics. Typically, the basecoat 14 is chemically or physically bonded (and/or adhered) to the substrate 10. Typically, a polyol is reacted with a polyisocyanate wherein the polyol contains —OH groups and the polyisocyanate contains —NCO groups. A sufficient quantity of a polyol is used such that the number of —NCO groups are in excess of the number of —OH groups. Preferably, the number of —NCO groups are about 15% in excess of the number of —OH groups (the number of —OH groups being dependent on the quantity of the polyol used and the number of —OH groups present in each molecule of the polyol). It is necessary that there remain a sufficient number of unreacted —NCO groups in the basecoat 14 for further reaction to bind to the topcoat 12.

An exemplary reaction to form the basecoat 14 is shown below:

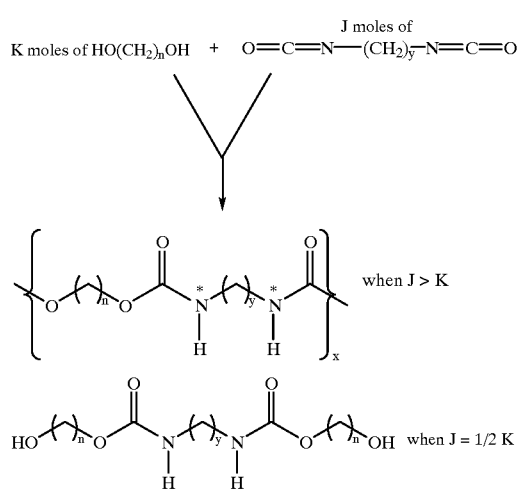

In the exemplary reaction shown above, the moles J (of exemplary diisocyanate) and moles K (of exemplary diol) can be varied to form a polyurethane type polymer forming the basecoat 14. However, to form a suitable basecoat 14, there must be a sufficient excess of moles J of a polyisocyanate (i.e. a sufficient excess of the —NCO groups in the polyisocyanate) such that upon reaction with K moles of the polyol there will remain unreacted —NCO groups in the basecoat 14 so formed.

Thus, by contrast, in the exemplary case of the above reaction wherein J=½K, no unreacted —NCO groups remain in the polymer so formed. Consequently, the polymer so formed (i.e. wherein J=½K) is not suitable to form a basecoat 14. Typically, the moles of polyisocyanate must be greater than the moles of the polyol when the number of isocyanate groups per molecule of polyisocyanate is equal to the number of hydroxyl groups per molecule of polyol. More specifically, the moles of isocyanate groups must be in excess of the moles of hydroxyl groups present to form a suitable basecoat 14. In general, the following condition must be met in order to form a suitable basecoat 14:

(J moles of polyisocyanate)×(number of isocyanate groups per molecule of polyisocyanate)>(K moles of polyol)×(number of hydroxyl groups per molecule of polyol).

For example, when diol (A) is used and diisocyanate (B) is used to form the basecoat (each compound having 2 reactive groups—2 hydroxyl groups per diol molecule and 2 isocyanate groups per molecule), it is critical that the moles of isocyanate be in excess of moles of diol such that (after formation of the basecoat 14 by reaction of diol (A) and isocyanate (B)) there will be present unreacted isocyanate groups in the basecoat 14. For exemplary diol (A) and diisocyanate (B), (wherein each molecule of polyol contains a number of hydroxyl groups equal to the number of isocyanate groups per molecule of the polyisocyanate) it is typical that moles J>moles K More typically, moles J=1.10× moles K. Most typically, moles J=1.11×moles K. Preferably, moles J=1.12×moles K. More preferably, moles J=1.13× moles K. Even more preferably, moles J=1.14×moles K. Most preferably, moles J=1.15×moles K.

Figure 4:
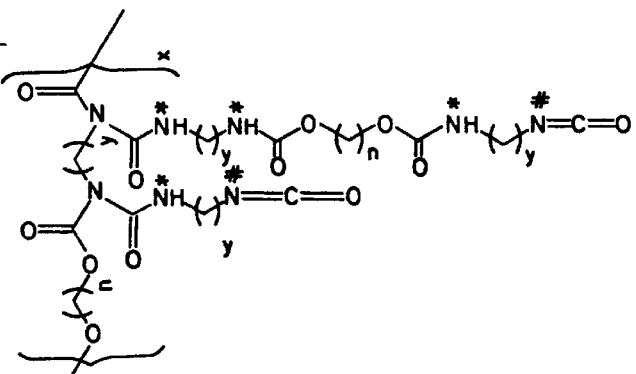
FIG. 4 depicts an exemplary basecoat 14 structure wherein unreacted —NCO groups are present within the basecoat 14 and marked by the pound sign (#). In addition, all secondary nitrogens within the polymer are marked by an asterisk (*). These secondary nitrogens (e.g. marked with asterisks (*)) may further react with another isocyanate group of a polyisocyanate leaving some terminal unreacted isocyanate groups (i.e. such as those marked with the pound sign (#)). In addition, some of the terminal isocyanate groups (i.e. those marked with the pound sign (#)) may further react with a polyol hydroxyl group to form a polyurethane linkage (—OCONH—) leaving a terminal —OH. The terminal —OH group from the polyol may then further react with an isocyanate group to form another polyurethane linkage leaving a terminal unreacted —NCO group (i.e. such as those marked with the pound sign (#)) within the exemplary basecoat 14. It is critical that there remain some unreacted —NCO groups within the basecoat 14 so formed upon reaction between an exemplary polyol and a molar excess of an exemplary polyisocyanate to polyol.

In the reaction depicted above wherein moles J>moles K, the secondary nitrogen groups marked with an asterisk may further react with another isocyanate group of a polyisocyanate (e.g. diisocyanate (B) to form a new bond. Another —OH from a polyol may further react with one of the —NCO groups of polyisocyanate wherein numerous unreacted isocyanate groups are present at the surface of basecoat 14. Several exemplary basecoat 14 structures are depicted below:

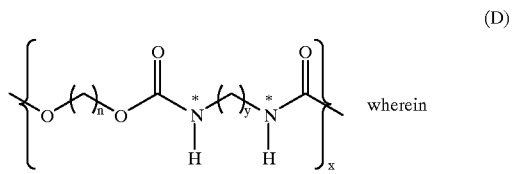

wherein x is between 5–500, n and y are between 6–1000. Note that x may have a value between 109–100, 12–50, 15–25, respectively. The secondary nitrogens marked by asterisks in structure (D) may further react with other polyisocyanates yielding unreacted —NCO groups at the surface of basecoat 14 as depicted below and marked by the # sign in FIG. 4 wherein the approximate location of topcoat 12 to be formed is depicted as a point of reference. In addition, in FIG. 4, the basecoat 14 having surface —NCO groups that are unreacted with any polyol and marked with the # sign depict schematically an exemplary basecoat 14, the surface —NCO groups extending from a backbone representing a polymer of polyethylenes connected by polyurethane linkages. Once an exemplary basecoat 14 is formed upon an exemplary substrate 10 as depicted in FIG. 6, a topcoat 12 is then formed on the exemplary basecoat 14 as depicted in FIGS. 4, 5 and 7, respectively. In FIG. 6, only the terminal —NCO groups of the exemplary basecoat 14 are depicted with the backbone of polyurethane linkages depicted by branching and non-branching lines. In fact, the exemplary basecoat 14 in FIG. 5 is also represented in exemplary FIG. 6.

Figure 8:
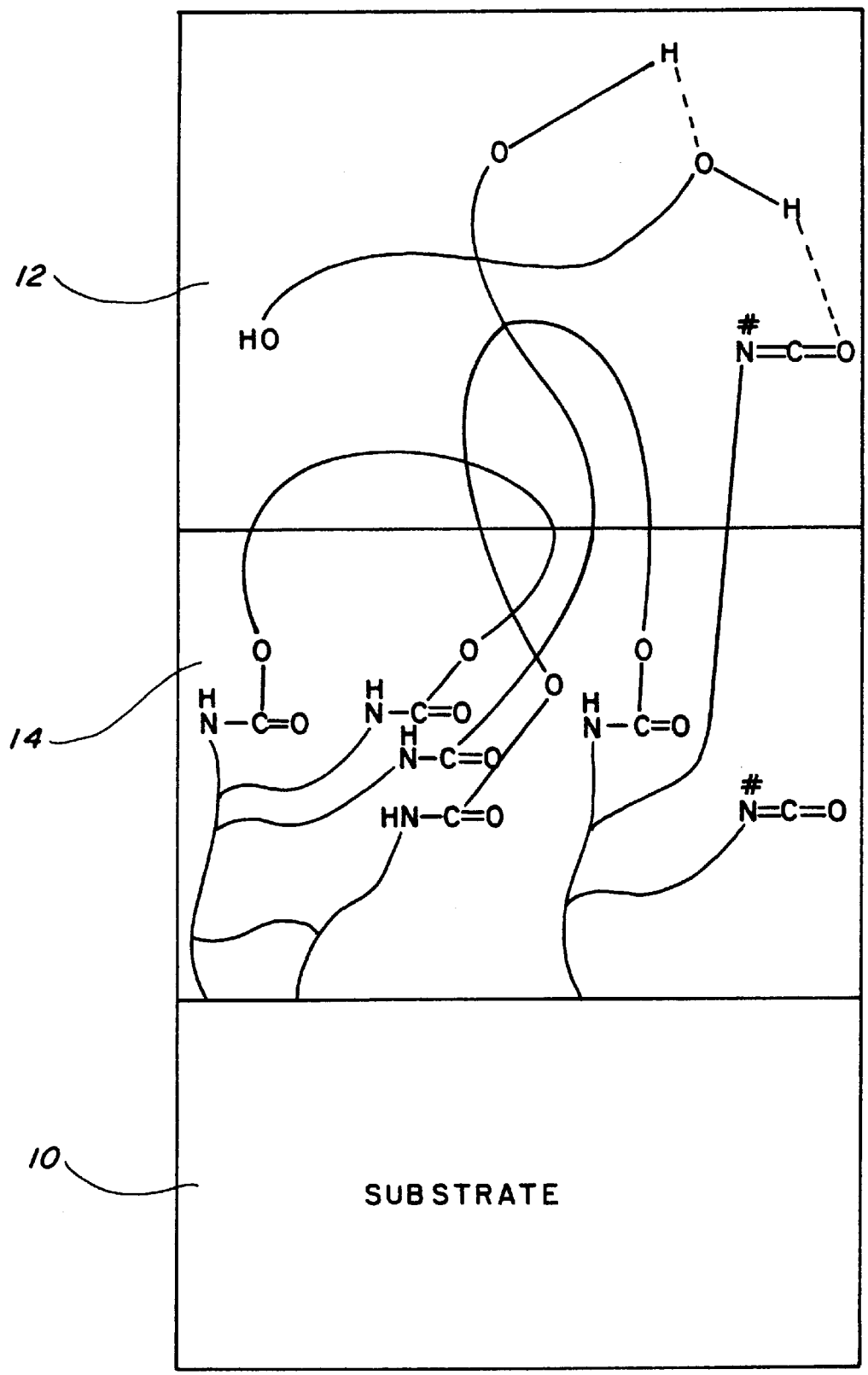
FIG. 8 schematically shows the exemplary structure of topcoat 12. In like manner to that of FIG. 6, the topcoat 12 depicted in FIG. 8 shows the backbone of the polymer represented by branched and unbranched lines. Note that the topcoat 12 is comprised mostly of exemplary methylene groups with the polyurethane linkages, typically, buried in the basecoat 14. It is the presence of —(CH$_2$)$_{n'}$— groups in the topcoat which imparts the antifouling properties to the bulk material and coating of the present invention.

To form the topcoat 12, a sufficient amount of a polyol or mono-alcohol is added to the basecoat 14 to form polyurethane linkages with at least 30 % of the unreacted —NCO groups present within the basecoat 14 (the unreacted —NCO groups being marked by # in exemplary FIGS. 4, 5 and 6). An exemplary topcoat 12 is depicted in FIG. 7. In like manner to that of FIG. 6, the topcoat 12 depicted in FIG. 8 shows a backbone of the polymer represented by branched and unbranched lines. Note that the topcoat 12 is comprised mostly of exemplary methylene groups with urethane linkages, typically, buried in the basecoat 14. It is the presence of branched or unbranched —(CH$_2$)$_n$— groups in the topcoat which imparts the antifouling properties to the bulk material and coating of the present invention.

The topcoat 12 acts as a barrier between the basecoat 14 (and substrate 10) and marine organisms and/or plants. Thus, while a basecoat 14 is strongly attached to the substrate 10 via exemplary urethane linkages (or via adsorption, absorption or chemical bonding), these exemplary urethane linkages are coated with an essentially non-polar topcoat 12. The essentially non-polar topcoat 12 prevents contact between marine organisms and/or plants with the exemplary urethane linkages of the basecoat 14. Similarly, the topcoat 12 acts as a barrier and prevents and/or sufficiently minimizes contact between marine organisms and/or plants and the substrate 10.

In the absence of an essentially non-polar topcoat 12, the basecoat's tendency to adhere to marine organisms and/or plants remains unchecked, thus, defeating the utility of the present invention as an antifouling coating and/or bulk material. In other words, the essentially non-polar topcoat 12 must coat the underlying basecoat 14 to impart antifouling properties to the coating of the present invention. It should be noted that while the basecoat 14 imparts strong adhesion to the substrate 10 (adhesion that the topcoat 12 alone cannot maintain with the substrate 10 due to its essentially non-polar character), the topcoat 12 imparts the antifouling characteristics of the present invention. The basecoat 14 provides a means to bond the topcoat 12 strongly to the substrate 10.

While all bonding permutations between a branched or unbranched aliphatic polyol and a branched or unbranched aliphatic polyisocyanate have not been schematically drawn, it is to be understood that a product made by the process of reacting a branched or unbranched aliphatic polyol with a molar excess of an aliphatic branched or unbranched polyisocyanate form a typical basecoat 14. Such a basecoat 14 is understood to be within the scope of the present invention.

The basecoat 14 bonds and/or attaches strongly to the substrate 10 via either adsorption, absorption, chemical reaction or some combination thereof. All permutations of forming a basecoat 14 by the reaction of an aliphatic branched or unbranched polyol and a molar excess of an aliphatic branched or unbranched polyisocyanate fall within the scope of the present invention.

Likewise, all permutations of forming a topcoat 12 by the reaction of an aliphatic branched or unbranched polyol or mono-alcohol and a terminal isocyanate group(s) of the basecoat 14 fall within the scope of the present invention. However, typically, at least about 30% of the isocyanate groups of the basecoat 14 must react with an aliphatic branched or unbranched polyol (typically, via urethane linkages) or mono-alcohol to form a suitable robust, nontoxic, antifouling polymer comprising a basecoat 14 and a topcoat 12.

Typically, a polyol or mono-alcohol is selected having sufficient —OH groups and sufficient non-polar branched or unbranched aliphatic content in sufficient molar quantity wherein at least about 30% of all the isocyanate (i.e. —NCO) groups of the basecoat 14 react with the polyol or mono-alcohol —OH groups. By such reaction between the polyol (e.g. diol (A)) or mono-alcohol and the isocyanate(s) of the basecoat 14, a topcoat 12 is formed.

A sufficient quantity of polyol or mono-alcohol having sufficient —OH groups and sufficient non-polar branched and/or unbranched aliphatic content is used to bond with at least 30%, 35%, 40%, 45%, 50%, 55%, 60%, 65%, 70%, 75%, 80%, 85%, 90%, 95% and 100% of the isocyanate groups of basecoat 14, respectively, to form topcoat 12.

Having described the invention, the following examples are given to illustrate specific applications of the invention, including the best mode now known to perform the invention. These specific examples are not intended to limit the scope of the invention described in this application.

EXAMPLES

Example 1

A steel test panel was roughened with #240 sand paper, washed in order with soapy water, water, acetone, and toluene. The panel was held level and warmed to 140° C. Basecoat: 480 mg (2.4 mmol) of dedecane-1,12-diol was heated in a small test tube to 90° C. in a chamber furnace, at which temperature the diol became a liquid. The chamber furnace was degassed at about 5 mm Hg for 5 minutes. To the test tube was added 0.10 mL chlorobenzene, 500 mg (3.0 mmol) hexane-1,6-diisocyanate, and 2 drops of a 10% solution of dibutyltin dilaurate in methyl isobutyl ketone. This reaction mixture was then held at 90° C. for 5 minutes, then at 140° C. for 90 seconds, then poured onto the steel panel which was at 140° C. The solution was spread out into a film using a drawdown bar with a gap thickness of 0.010 inches (254 μm) and held at 140° C. for 90 seconds.

Topcoat: At this time a previously prepared solution of Grubbs' diol (hydroxy-telechelic polyethylene with MW of about 3,300; 300 mg) in 1.5 mL chlorobenzene held at 120–140° C. was poured onto the basecoat and spread out into a film (on the basecoat film previously formed on the steel test panel by using a drawdown bar with a gap thickness of 0.010 inches (254 μm)) and held at 140° C. for 90 seconds.

Final: A coating system which was tough, hard, and smooth was produced. The basecoat thickness was about 0.003 inches and the topcoat thickness was about 0.0016 inches, for a total system thickness of about 0.005 inches.

Result: The test panel made according to Example 1 was immersed in the waters of the Chesapeake Bay for seven months (7) for testing. During this time, the test panel so prepared was examined at 4–6 week intervals. The test panel exhibited no evidence of shell fouling. However, an easily removable slime of no more than 50 micron thickness was observed on the test panel. Note that the slime was easily removed using light pressure (e.g. rubbing the surface with your finger).

Example 2

(Not Tried)

Mix 2.2 g (100 mmol) of dodecane-1,12-diol, 3.45 g (205 mmol) of hexane-1,6-diisocyanate, and 20 mL of a 10% solution of dibutyltin dilaurate in methyl isobutyl ketone. The 10% solution of dibutyltin dilaurate in methyl isobutyl ketone acts as a catalyst for forming urethane linkages. While the use of the catalyst is preferred, it is not essential for forming the antifouling polymer of the present invention. Heat the above mixture to 90° C. and hold at that temperature for 10 minutes. To a solution of 47 g of Grubbs' diol (made according to Example 1) in 250 mL of chlorobenze at 120–140° C., add the above heated mixture containing the 2.2 g (100 mmol) of dodecane-1,12-diol, 3.45 g (205 mmol) of hexane-1,6-diisocyanate, and 20 mL of a 10% solution of dibutyltin dilaurate in methyl isobutyl ketone. Hold the solution so formed at 120–140° C. for 60 minutes and distill off the chlorobenzene slowly until a viscous syrup remains Pour the syrup into molds and heat under vacuum at 120° C. until a cured antifouling bulk material is obtained.

Example 3

(Not Tried)

Follow the procedure of exemplary process (I), supra, or process (II), supra, mixing all components following the procedure according to Example 1 or Example 2, respectively (i.e preparing substrate, solvents used and temperatures used to form basecoat film; solvents used and temperatures used to form topcoat film—Example 1; also, vaccuum applied and distillation temperatures used and solvents used to form the bulk material—Example 2).

Use any of the following in place of Diol (A) and Diol (C):

(1) KRATON LIQUID™ Polymer HPVM-2203 (Shell Chemical Company)—A branched diol with a MW of between about 118–10,000;

(2) Grubb's diol has the structure $HO(CH_2)_nOH$ wherein n is about 116, MW of about 3300 grams;

(3) Fully saturated hydrocarbon diols in which chain branches of any number, size and sructure are permitted and wherein there are two terminal hydroxyl groups.

Use any of the following in place of Diol (C):

(1) A monohydroxy aliphatic branched or unbranched alcohol instead of a polyol;

(2) KRATON LIQUID™ Polymer HPVM-1202 (Shell Chemical Company), MW of between about 2,000–10,000 grams;

(3) KRATON LIQUID™ Polymer HPVM-1302 (Shell Chemical Company), MW of between about 2,000–10,000 grams;

(4) KRATON LIQUID™ Polymer EKP-207 (Shell Chemical Company), MW of between about 2,000–10,000 grams;

(5) KRATON LIQUID™ Polymer HPVM-1301 (Shell Chemical Company), MW of between about 2,000–10,000 grams;

(6) KRATON LIQUID™ Polymer EKP-206 (Shell Chemical Company), MW of between about 2,000–10,000 grams;

(7) Fully saturated branched or unbranched primary or secondary mono alcohols; MW of between about 100–10,000 grams.

Moles of each component used to form the respective components as indicated below:

| Basecoat: Diol (A) | Diisocyanate (B) | Topcoat: Diol (C) |
|---|---|---|
| 1.0 | ≧1.01 | 0.01–1.01 |
| 1.0 | ≧1.10 | 0.1–1.1 |
| 1.0 | ≧1.50 | 0.5–1.5 |
| 1.0 | ≧2.0 | 0.01–2.0; 1.0 preferred |

Figure 1:
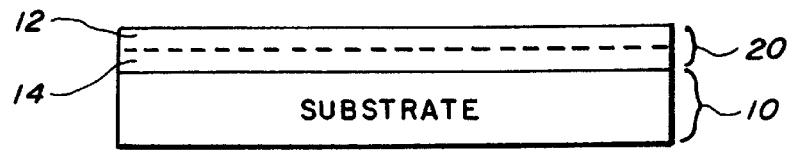
FIG. 1 is a cross-section of an exemplary substrate 10 having an antifouling coating 20 bonded/attached to the substrate 10. The antifouling coating 20 is comprised of a basecoat 14 and a topcoat 12.
Figure 2:
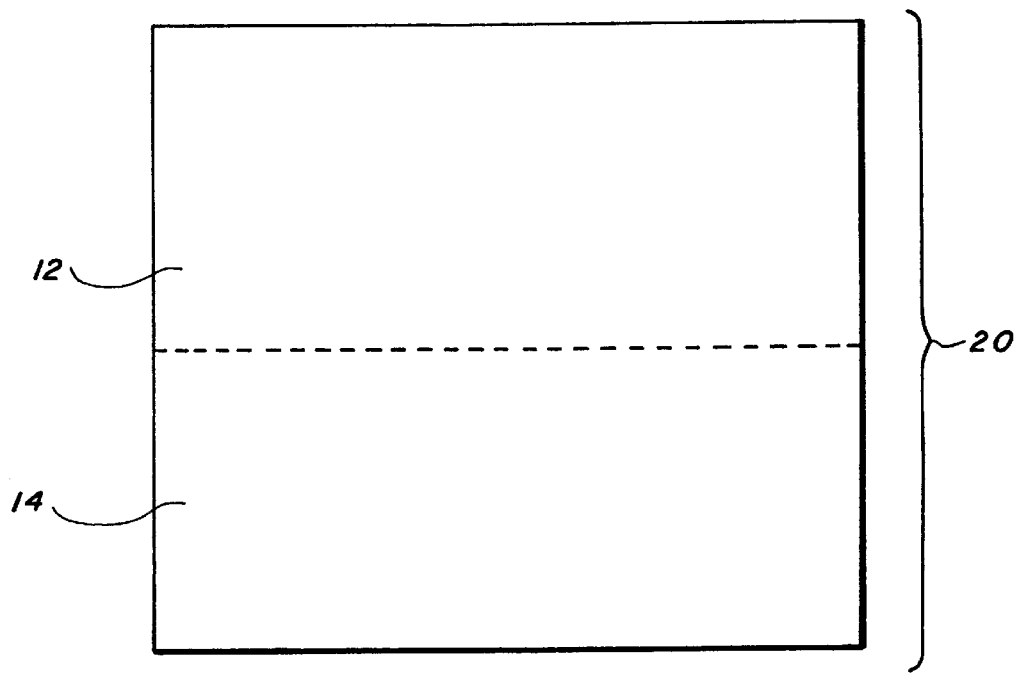
FIG. 2 is a close-up cross-section of the antifouling coating 20 depicted in FIG. 1. The exemplary basecoat is labeled 14. The exemplary topcoat is labeled 12.
Figure 3:
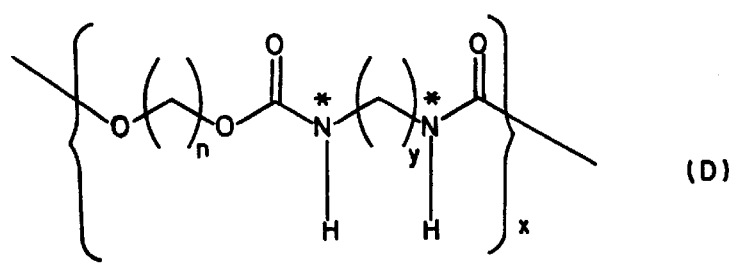
FIG. 3 depicts the structure of an exemplary basecoat 14 wherein the secondary nitrogens (marked by asterisks in structure (D)) may further react with other polyisocyanates yielding unreacted —NCO groups at the surface of exemplary basecoat 14. Note that the surface —NCO groups that are unreacted are not shown in FIG. 3.

The thickness of the antifouling coating 20 (See FIG. 1, supra) made according to these examples is typically ≧1 μm or between about 1–375 μm, 50–350 μm, 60–300 μm, 70–200 μm, 100–175 μm and 125–150 μm, respectively.

What is claimed:

1. An antifouling coating made by a process comprising the steps of (1) bonding a basecoat upon a substrate by reacting a first amount of diol (A) having the structure:

$$HO-(CH_2)_n-OH \qquad (A)$$

with a second amount of diisocyanate (B) having the structure:

$$OCN-(CH_2)_y NCO \qquad (B)$$

wherein moles of said diisocyanate (B) is in a molar excess to moles of said diol (A), wherein each of integers n and y are greater than or equal to six, said basecoat having unreacted OCN— groups; and (2) forming a topcoat on said basecoat by reacting a third amount of diol (C) with said basecoat, said diol (C) being selected from the group consisting of:

$$HO-(CH_2)_n-OH \qquad (C1);$$

branched aliphatic diol having a molecular weight between about 118–10,000 grams (C3); and mixtures thereof, wherein said n' is an integer greater than or equal to six in said third amount sufficient to react with at least 30% of the unreacted OCN— groups of said basecoat that are available for reacting with said diol (C).

2. The antifouling coating of claim 1 wherein n and n' are between 6–1000 and y is between 6–1000 and said third amount is sufficient to react with at least 35% of said OCN— groups of said basecoat that are available for reacting with said diol (C).

3. The antifouling coating of claim 2 wherein n and n' are between 7–500 and y is between 7–500 and said third arnotmt is sufficient to react with at least 40% of said OCN— groups of said basecoat that are available for reacting with said diol (C).

4. The antifouling coating of claim 3 wherein n and n' are between 8–300 and y is between 8–300 and said third amount is sufficient to react with at least 45% of said OCN— groups of said basecoat that are available for reacting with said diol (C).

5. The antifouling coating of claim 4 wherein n and n' are between 9–100 and y is between 9–100 and said third amount is sufficient to react with at least 50% of said OCN— groups of said basecoat that are available for reacting with said diol (C).

6. The antifouling coating of claim 5 wherein n and n' are between 10–20 and y is between 10–20 and said third amount is sufficient to react with at least 55% of said OCN— groups of said basecoat that are available for reacting with said diol (C).

7. The antifouling coating of claim 6 wherein n and n' are between 12–15 and y is between 12–15 and said third amount is sufficient to react with at least 60% of said OCN— groups of said basecoat that are available for reacting with said diol (C).

8. The antifouling coating of claim 2 wherein n and n' are between 12–15 and y is between 12–15 and said third amount is sufficient to react with at least 70% of said OCN— groups of said basecoat that are available for reacting with said diol (C).

9. The antifouling coating of claim 2 wherein n and n' are between 12–15 and y is between 12–15 and said third amount is sufficient to react with at least 80% of said OCN— groups of said basecoat that are available for reacting with said diol (C).

10. The antifouling coating of claim 9 wherein n and n' are between 12–15 and y is between 12–15 and said third amount is sufficient to react with at least 90% of said OCN— groups of said basecoat that are available for reacting with said diol (C).

* * * * *